United States Patent [19]

Innes et al.

[11] Patent Number: 5,706,153

[45] Date of Patent: Jan. 6, 1998

[54] PROGRAMMER FOR STARTER

[75] Inventors: Mark E. Innes; Gregory A. Helton, both of Asheville, N.C.; Ralph Rosa, Whitefish Bay; Lee E. Smith, Wauwatosa, both of Wis.

[73] Assignee: Eaton Corporation, Cleveland, Ohio

[21] Appl. No.: 659,105

[22] Filed: Jun. 3, 1996

[51] Int. Cl.$^6$ .................................................. H02H 5/04
[52] U.S. Cl. ........................... 361/31; 361/87; 361/93; 361/102; 364/483
[58] Field of Search .................. 361/23–25, 28–31, 361/33, 78–79, 85–87, 93–97, 102; 364/481, 483

[56] References Cited

U.S. PATENT DOCUMENTS

| | | | |
|---|---|---|---|
| 4,434,390 | 2/1984 | Elms | 318/473 |
| 4,544,814 | 10/1985 | Butterworth et al. | 200/50 C |
| 4,747,061 | 5/1988 | Lagree et al. | 364/483 |
| 4,751,605 | 6/1988 | Mertz et al. | 361/91 |
| 4,760,364 | 7/1988 | Ostby | 335/132 |
| 4,766,273 | 8/1988 | Butterworth et al. | 200/147 R |
| 4,827,369 | 5/1989 | Saletta et al. | 361/96 |
| 4,870,531 | 9/1989 | Danek | 361/93 |
| 5,101,316 | 3/1992 | Levain | 361/93 |
| 5,170,360 | 12/1992 | Porter et al. | 364/483 |
| 5,270,898 | 12/1993 | Elms et al. | 361/96 |
| 5,301,121 | 4/1994 | Garverick et al. | 364/483 |
| 5,426,592 | 6/1995 | Leone et al. | 364/492 |
| 5,490,086 | 2/1996 | Leone et al. | 364/492 |
| 5,500,781 | 3/1996 | Santos et al. | 361/96 |

*Primary Examiner*—Jeffrey A. Gaffin
*Assistant Examiner*—Michael Sherry
*Attorney, Agent, or Firm*—Larry G. Vande Zande

[57] ABSTRACT

A motor starter includes separable contacts; an operating mechanism for operating the separable contacts; an overload relay controller including a memory for storing the settings for a plurality of selectable operating features, and a microprocessor for retrieving the settings from the memory and employing the settings at least for controlling the operating mechanism; and a programmer module temporarily engaging the overload relay controller for changing the settings in the memory.

22 Claims, 10 Drawing Sheets

PROGRAMMER FOR STARTER

BACKGROUND OF THE INVENTION

1. Field of the Invention

This invention relates to a starter for controlling electrical power to a load and, more particularly, to a starter employing a programmer for programming overload relay operating features.

2. Background Information

Electromagnetic contactors include a plurality of movable electrical contacts which are brought into contact with a plurality of fixed electrical contacts to close the contactor. The movable electrical contacts are separated from the fixed contacts to open the contactor. Examples of contactors are disclosed in U.S. Pat. No. 4,760,364; and 4,766,273.

A common type of starter for loads, such as motors, lighting, and the like, comprises an electromagnetic contactor and an overload relay. In a motor starter, for example, the purpose of the overload relay is to estimate the heat produced in the motor by line current and "trip" or stop the motor if the retained heat exceeds an acceptable level. The overload relay monitors the load current and trips the contactor open if a persistent overcurrent condition exists. Typically, the overload relay tracks an $I^2t$ characteristic of the load current which is a measure of heating.

Today, it is common for the overload relay to contain a microprocessor which digitally generates the $I^2t$ characteristic. When the calculated $I^2t$ value reaches a trip level, the contactor is tripped open to interrupt the flow of current to the load.

It is known to provide a plurality of dual in-line package (DIP) switches on an overload relay for selecting the features thereof such as, for example, heater, class, phase loss, jam and phase imbalance (or phase unbalance). It is also known to utilize a programming device, such as a hand-held or field programmer, to select such features of a circuit breaker or an overload relay through a local or remote communications link. It is further known to utilize a removable display and keypad to display and/or change storm trip parameters of a circuit breaker. However, there is room for improvement.

SUMMARY OF THE INVENTION

The present invention is directed to a starter including separable contacts; operating means for operating the separable contacts; overload relay means including memory means for storing at least one setting for at least one selectable operating feature and processor means for retrieving the setting for the selectable operating feature from the memory means and employing the setting for the selectable operating feature at least for controlling the operating means; and means temporarily engaging the overload relay means for changing the setting for the selectable operating feature in the memory means.

As another aspect of the invention, an overload relay apparatus for use with an electrical contactor includes overload relay controller means including memory means for storing at least one setting for at least one selectable operating feature and processor means for retrieving the setting for the selectable operating feature from the memory means and employing the setting for the selectable operating feature at least for controlling the electrical contactor; and means temporarily engaging the overload relay controller means for changing the setting for the selectable operating feature in the memory means.

It is an object of the present invention to program an operating feature of a starter by temporarily installing a programming device therewith.

It is another object of the present invention to provide a low cost programming device which may be used with a plurality of starters.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

As employed herein, the term "operating feature" shall expressly include, but not be limited to, any starter or overload relay operating feature such as, for example, heater, class, and enable and/or disable states of local programming lock, phase loss, phase imbalance (or phase unbalance), manual/automatic reset, and jam.

As employed herein, the term "setting" shall expressly include, but not be limited to, any analog or digital value, or any representation of an operating feature.

Figure 1:
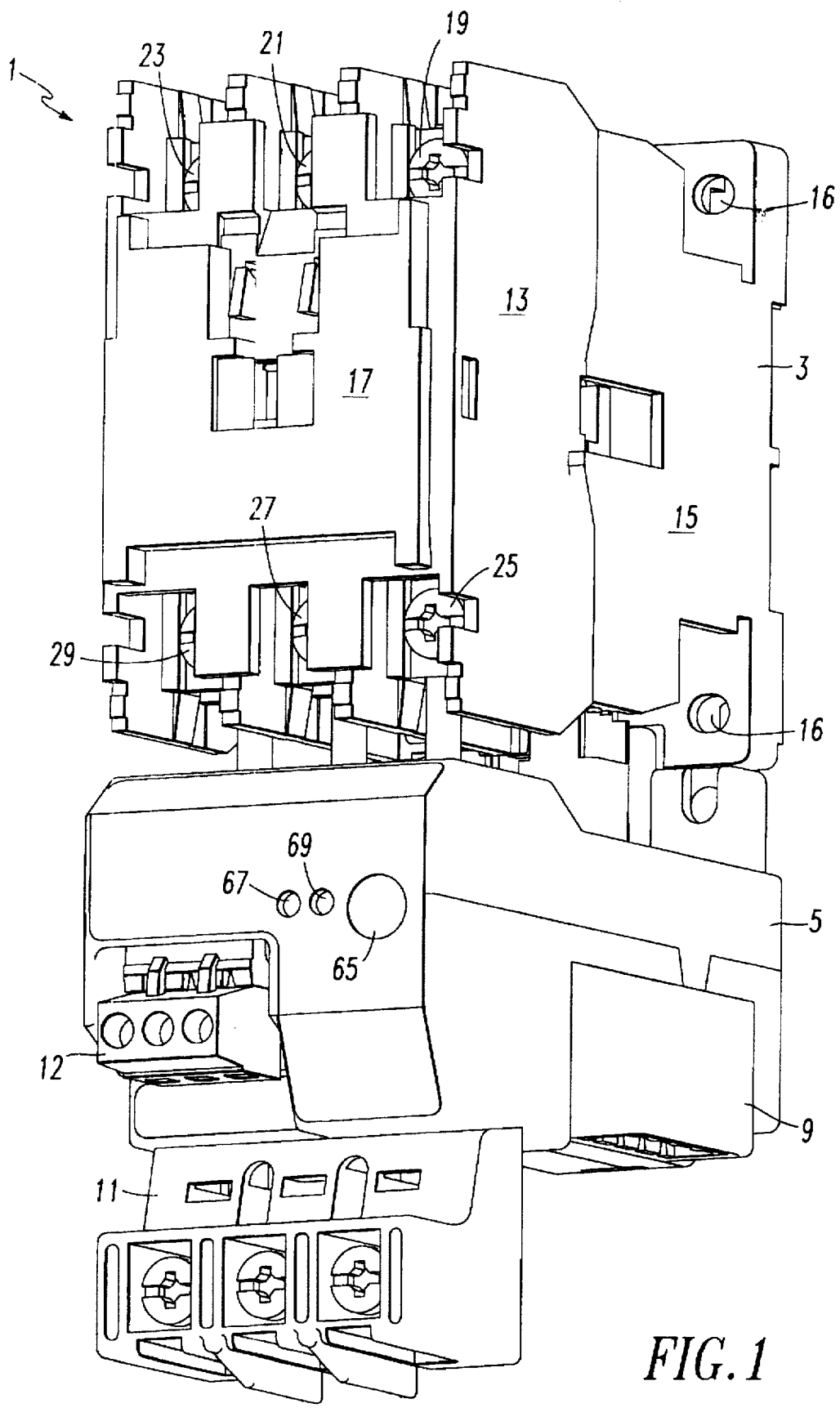
FIG. 1 is an isometric view illustrating the several modules, including an electrical contactor, an overload/controller module and a hardware programmer module, of the contactor control system of the present invention in assembled form.
Figure 2:
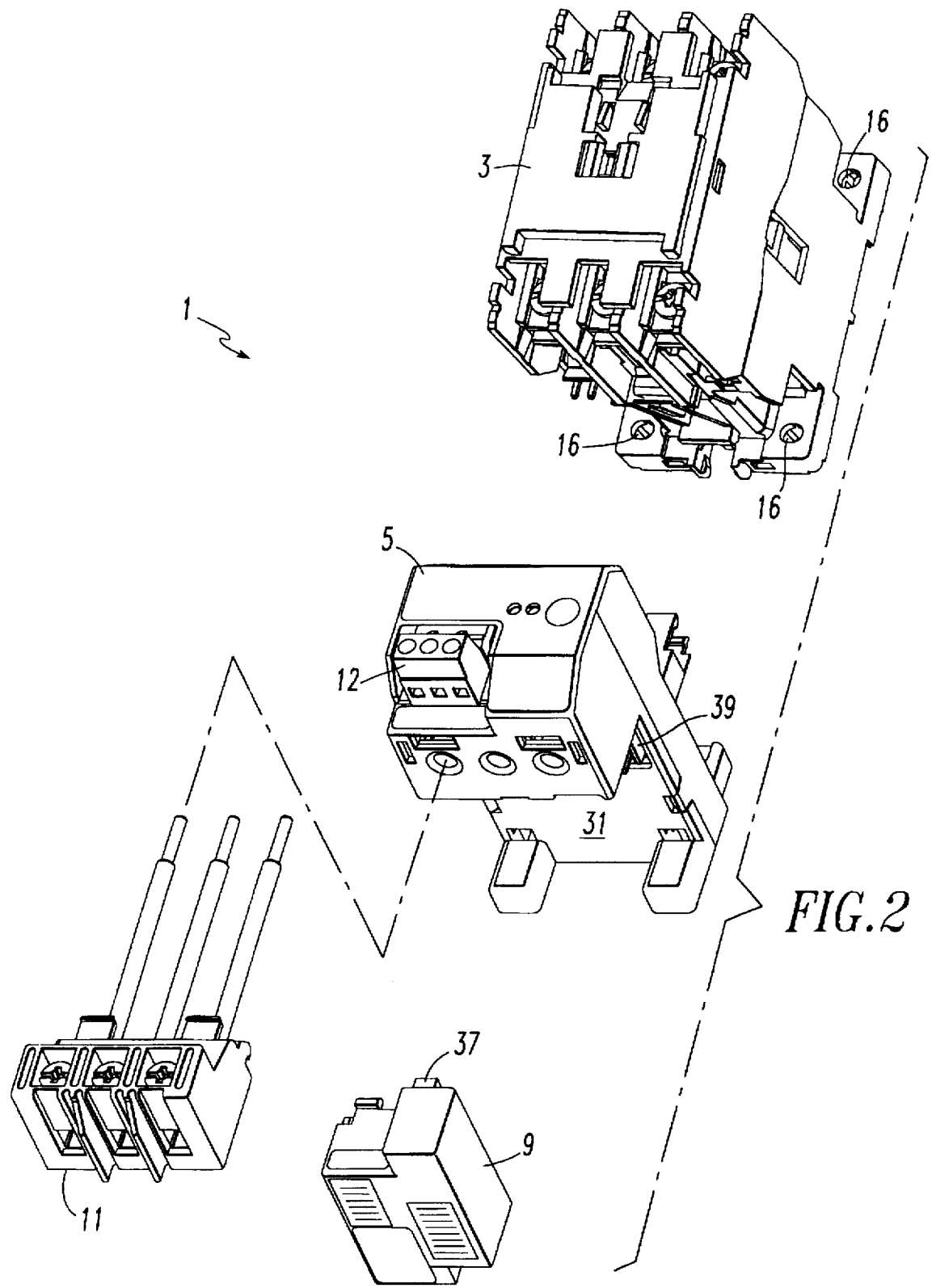
FIG. 2 is an exploded, isometric view of the several modules of the contactor control system of FIG. 1.

Referring to FIGS. 1 and 2, a motor starter, such as contactor control system 1, is illustrated. The exemplary contactor control system 1 includes an electrical contactor, such as contactor module 3; an overload relay, such as overload/controller module 5 connected to the contactor module 3; an optional plug-in module, such as hardware programmer module 9; a power terminal block module 11; and an optional surge suppressor module 12. Each of the modules 9,11,12 is connected to the overload/controller module 5. Although the exemplary contactor control system 1 is a motor starter, the present invention is applicable to other types of starters, such as motor controllers, lighting controllers and load controllers.

The contactor module 3 is, preferably, an electromagnetic contactor of the type disclosed in U.S. Pat. No. 4,760,364 which is incorporated by reference herein. The contactor module 3 includes an upper housing 13, a lower housing 15, and a removable cover 17 over the upper housing 13. The upper housing 13 has line terminals 19,21,23 and load terminals 25,27,29 for three separable contacts 20 (shown in FIG. 4). The three phases or poles of separable contacts 20 are connected between terminal pairs 19–25, 21–27, and 23–29. The contactor module 3 may be physically secured to a mounting panel (not shown) by way of several screws (not shown) which fit into holes 16 located in the corners of the lower housing 15.

Figure 3:
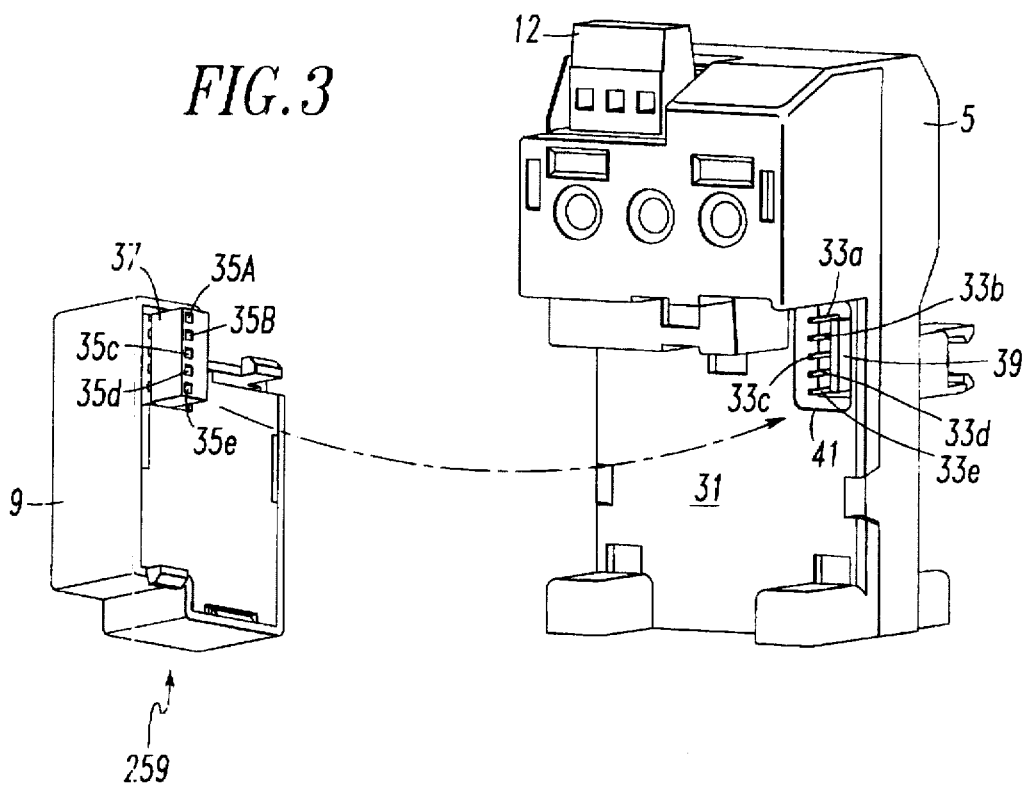
FIG. 3 is an exploded, isometric view of the overload/controller module and the hardware programmer module of FIG. 1 where these modules are rotated to illustrate the electrical and mechanical connections therebetween.

FIG. 3 illustrates the module 9 for mounting within the underside 31 of overload/controller module 5. The modules 5,9 are rotated to illustrate the electrical and mechanical connections therebetween. The module 9 temporarily engages the module 5 by inserting pins 33a,33b,33c,33d,33e of module 5 into ports 35a,35b,35c,35d,35e, respectively, of a member, such as connector member 37 of module 9, whereby member 37 frictionally engages wall 39 and the opposing wall in aperture 41 of module 5. In this manner, the module 9 may temporarily engage the module 5.

Figure 4:
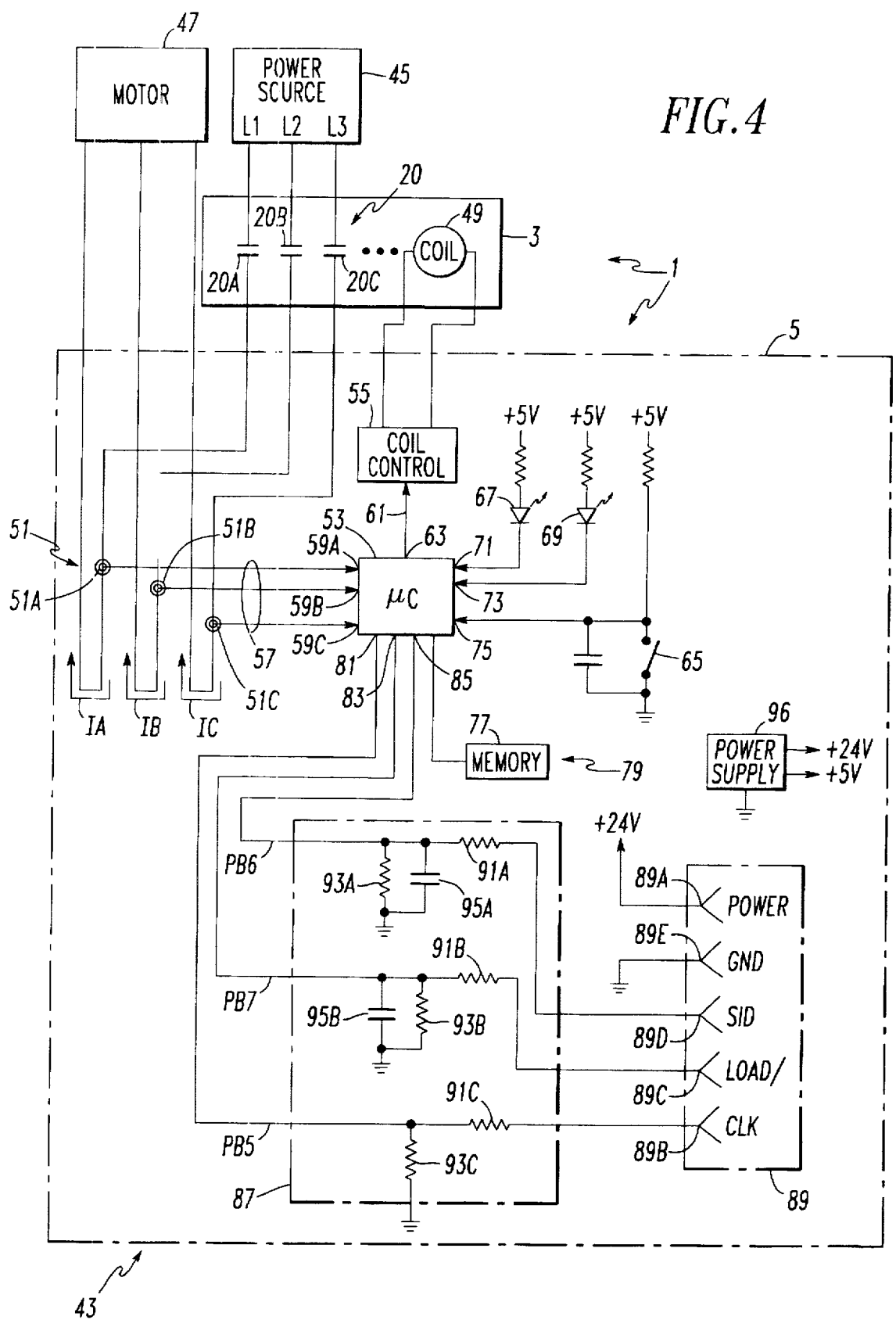
FIG. 4 is a schematic diagram in block form of the electrical contactor and overload/controller module of FIG. 1 including a microcomputer.

FIG. 4 illustrates an electrical circuit 43 including a three-phase power source 45 having three phases L1,L2,L3; the contactor module 3; the overload/controller module 5; and a three-phase load, such as motor 47, although the invention is applicable to a wide variety of electrical circuits, power sources and loads having any number of phases. The exemplary contactor module 3 includes the separable contacts 20 having separable contacts 20A,20B,20C for the respective phases L1,L2,L3. The separable contacts 20A, 20B,20C switch electrical currents IA,IB,IC, respectively, flowing between the power source 45 and the motor 47. The contactor module 3 also includes an operating mechanism for operating the separable contacts 20, having a coil 49, which controls opening and closing of the separable contacts 20.

The exemplary overload/controller module 5 includes a three-phase current sensor 51; a processor, such as microcomputer (μC) 53; and a coil control circuit 55. The current sensor 51 includes current sensors, such as current transformers 51A,51B,51C, which sense the electrical currents IA,IB,IC, respectively, flowing between the power source 45 and the motor 47. The current sensor 51 provides three analog sensed current values 57 to three analog inputs 59A,59B,59C of the microcomputer 53 which converts the analog values 57 to digital values using a multiplexed analog-to-digital converter (not shown). The microcomputer 53 uses the digital values to control the open or closed state of the separable contacts 20 with a control signal 61 on a digital output 63. The digital output 63 is interconnected with the coil control circuit 55 which drives the coil 49.

The overload/controller module 5 also includes a switch, such as membrane pushbutton 65; and two indicators, such as light emitting diodes (LED's) 67,69. The microcomputer 53 has outputs 71,73 for driving the LED's 67,69, respectively; and an input 75 for receiving user provided input from the pushbutton 65. The module 5 further includes a memory 77, such as an EEPROM, for storing settings 79 for various selectable operating features which are discussed in greater detail below and in connection with FIG. 5. The microcomputer 53, in turn, retrieves the settings 79 from the memory 77 and employs the settings 79 for functions, such as controlling the coil 49 and LED's 67,69, as discussed in greater detail below in connection with FIGS. 6A–6E.

The microcomputer 53 also includes three pins or terminals 81,83,85 which are configurable to interface with a communication interface 87, such as a serial communication interface, although a variety of other interfaces (e.g., parallel) are possible. The terminals 81,83,85 are interconnected with a terminal block 89 by the communication interface 87. The terminal 85 generally inputs serial input data SID from PB6 terminal 89D, the PB7 terminal 83 generally outputs a low-true load signal LOAD/ to terminal 89C, and the PB5 terminal 81 generally outputs serial clock CLK to terminal 89B.

The terminal block 89 also includes terminals 89A,89E which supply power POWER (e.g., +24 V) and ground GND to a device, such as the module 9 of FIGS. 1–3 and 5. The communication interface 87 conditions the signals SID, LOAD/,CLK and protects the respective microcomputer terminals 85,83,81. The communication interface 87 includes resistors 91A,91B,91C, which limit current; and resistors 93A,93B,93C, which limit voltage, at the respective terminals 85,83,81. Capacitors 95A,95B reduce noise at the terminals 85,83, respectively. A suitable power supply 96 provides +24V and +5V power from a line voltage (not shown).

The overload/controller module 5 employs the settings 79 which correspond the selectable operating features as shown in Table I:

TABLE I

| SELECTABLE OPERATING FEATURE | DEFINITION |
|---|---|
| HEATER ($I_{RATED}$) | rated load current (e.g., rated motor current) |
| CLASS | time (s) to operate at $6I_{RATED}$ |
| LOCAL PROGRAMMING LOCK | local programming lock enabled/disabled |
| PHASE LOSS | phase loss protection enabled/disabled |
| PHASE IMBALANCE | phase imbalance (or phase unbalance) protection enabled/disabled (enables phase loss protection as subset fault) |
| MANUAL/AUTOMATIC RESET | automatic thermal reset mode enabled/disabled |
| JAM | jam enabled/disabled |

The settings 79 for the HEATER (e.g., $0-46_{10}$) and CLASS (e.g., $00_2 \equiv 10_{10}$, $01_2 \equiv 20_{10}$, $10_2 \equiv 30_{10}$ or $11_2 \equiv E$) selectable operating features have various numerical values for purpose of selection. For HEATER, binary selection values are directly mapped to corresponding base ten selection values. For CLASS, four different binary selection values correspond to four different CLASS values. The other settings 79 for the other operating features have digital values with "enabled" (e.g., true or 1) and "disabled" (e.g., false or 0) states for purpose of selection.

Figure 5:
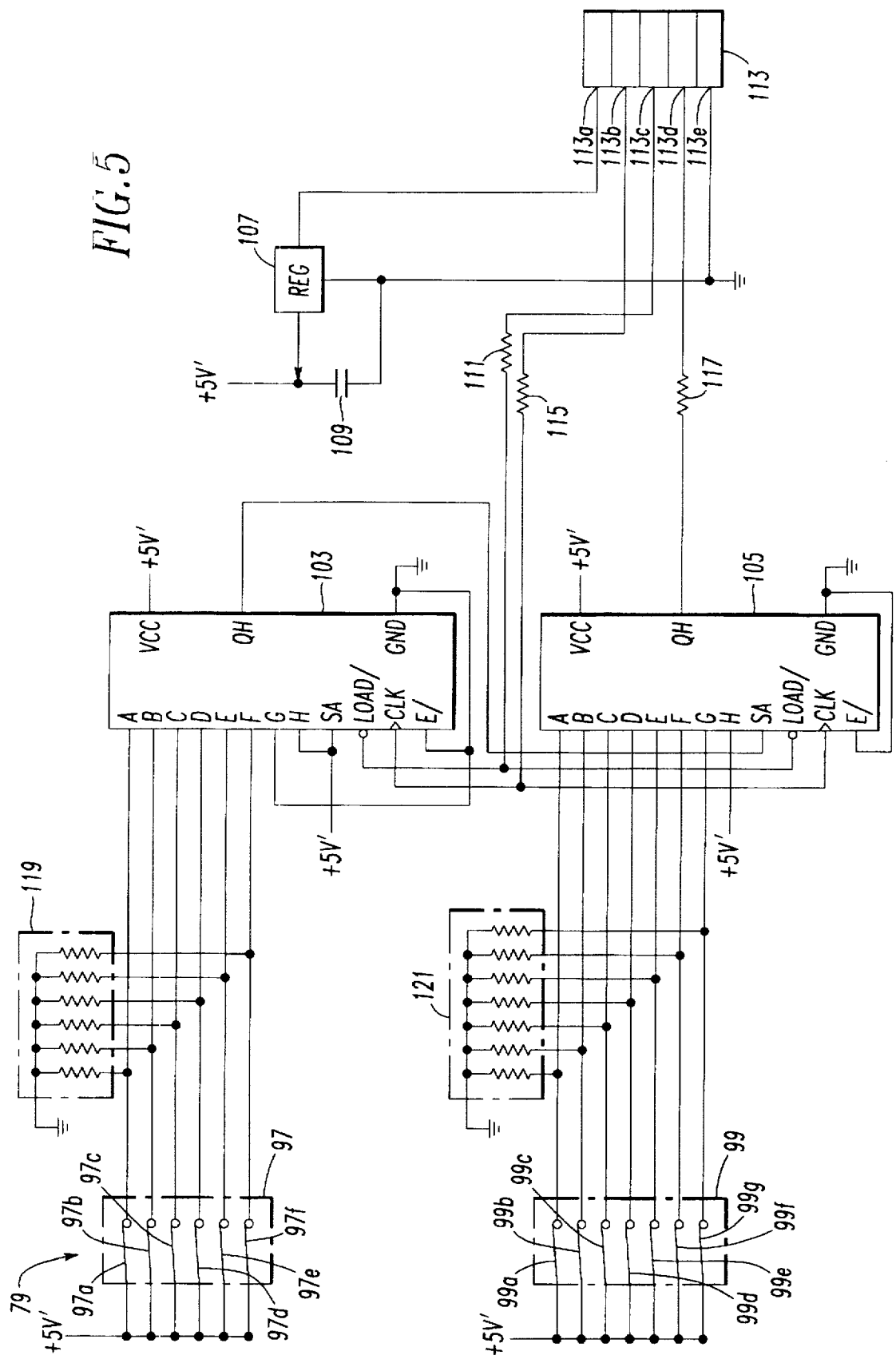
FIG. 5 is a schematic diagram of the hardware programmer module of FIG. 1.

Referring to FIG. 5, a schematic diagram of the hardware programmer module 9 is illustrated. As discussed in greater detail below in connection with FIGS. 6A–6E, the overload/ controller module 5 of FIG. 4 includes an option recognition function which recognizes a plurality of different option modules. One of these option modules, in the form of module 9, consists of two user friendly dual-inline-package (DIP) switches 97,99 interconnected with a parallel-to-serial output circuit 101 formed by exemplary parallel-to-serial converter integrated circuits 103,105. The module 9 functionally allows the user to add the DIP switches 97,99 and configure or set up the module 5, and then remove the module 9 leaving the settings 79 (shown in FIG. 4) from the DIP switches 97,99 for the operating feature selections in the memory 77 (shown in FIG. 4) of the module 5. The circuit 101 outputs the state of the DIP switches 97,99 and the settings 79 for the selectable operating features to facilitate programming such settings 79 in the memory 77 of module 5 of FIG. 4.

The module 9 also includes a power supply in the form of a linear regulator (REG) 107 and bypass capacitor 109 for circuits 103,105. The circuits 103,105 form two 8-bit serial configuration bytes for the module 5 of FIG. 4. The circuits 103,105 include transparent parallel-to-serial shift register latches therein (not shown). The load input LOAD/ of circuits 103,105 is tied back to the module 5 through a resistor 111 and terminal 113c of connector 113. When the input LOAD/ is active low, then the state of the DIP switches 97,99 and the data on the inputs A–H of both circuits 103,105, respectively, is loaded in the corresponding internal serial shift register latch. Bit H of circuit 105, which is tied to +5V', is output immediately to serial output QH thereof, with the remaining data being serially shifted or clocked out on the falling edge of the clock input CLK. The clock input CLK of circuits 103,105 is tied back to the module 5 through a resistor 115 and terminal 113b of connector 113. The output QH of circuit 105 is output to module 5 through a resistor 117 and terminal 113d of connector 113. The resistors 111,115,117 protect the circuits 103,105 from static discharge.

The inputs A–F of circuit 103, which input the state of the switches of DIP switch 97, and inputs A–G of circuit 105, which input the state of the switches of DIP switch 99, are pulled down through a corresponding resistor of resistor modules 119 and 121, respectively. On power up, the output terminal 113d is forced high, based on the exemplary high input H of circuit 105, while input terminals 113b,113c are respectively pulled low by resistors 93c,93b of module 5 as shown in FIG. 4. The high on output QH of circuit 105 and terminal 113d is a deterministic result of terminal 113c and load line LOAD/ being held low, even if no pulses on clock input CLK are received. As discussed below in connection with FIG. 6A, this allows the module 5 to recognize this option as module 9 by checking that terminal 113c (PB7, LOAD/) is low, and terminal 113d (PB6, SID) is high, thereby determining that the module 9 is present when terminals 113a–113e of connector 113 engage terminals 89a–89e, respectively, of terminal block 89.

Input G of circuit 103 is tied to an exemplary low and input H is tied to an exemplary high. The shift-in line SA of circuit 103 is tied high. The output QH of circuit 103 is tied to the shift-in line SA of circuit 105. The enable inputs E/ of circuits 103,105 are tied low. During operation, with all of the switches of the DIP switches 97,99 closed, for example, the inputs A–F of circuit 103 and inputs A–G of circuit 105 are tied high. In turn, the following serial data stream sequence is provided to module 5: "1111 1111 1011 1111". On the other hand, with all of the switches of the DIP switches 97,99 open, the following sequence is provided: "1000 0000 1000 0000". Regardless of the state of the switches of the DIP switches 97,99, the following sequence is provided: "1xxx xxxx 10xx xxxx", in which bit 0 (i.e., the serial bit corresponding to input H of circuit 105) and bit 8 (i.e., the serial bit corresponding to input H of circuit 103) are always true, bit 9 (i.e., the serial bit corresponding to input G of circuit 103) is always false, and "x" represents an arbitrary state of the switches of the DIP switches 97,99.

The serial data stream, which includes the state of the switches of the DIP switches 97,99 and the predefined bits, is output to and read by the overload/controller module 5 of FIG. 4 as follows. A low followed by a high is applied to terminal 113c and, hence, the load line LOAD/. Then, the QH output of circuit 105 is read from the terminal 113d. Next, the terminal 113b and, thus, the clock line CLK are set high and low, and, then, the QH output of circuit 105 is read from the terminal 113d. This clock and read sequence is repeated another 14 times for a total of 16 bits in the serial data stream.

Once a reading of 16 bits from the module 9 is taken, bit 8 must be high and bit 9 must be low in the serial data stream. Otherwise, an illegal option error is detected and indicated by the module 5. On the other hand, if the reading is correct, and suitable settings are provided, then the memory 77 is programmed by the microcomputer 53 as discussed below in connection with FIGS. 6A–6D.

The switches of the DIP switches 97,99 are defined below in Table II.

TABLE II

| DIP SWITCH | SWITCH NUMBER(S) | FUNCTION |
| --- | --- | --- |
| 97 | 97a,97b,97c,97d,97e,97f | Select heaters "Min_Heat" (e.g., 0, 33) to 46 for Nema motors; or heaters "Min_Heat" to 42 for Design E motors (if a number lower than "Min_Heat" or higher than the maximum (46 or 42, respectively) is entered, then the module 5 forces it to "Min_Heat") |
| 99 | 99a,99b | Class: <br> 99a 99b Selection <br> 0 0 Class 10 <br> 0 1 Class 20 <br> 1 0 Class 30 <br> 1 1 Design E |
| 99 | 99c | Local Programming Lock Enable |
| 99 | 99d | Phase Loss Enable |
| 99 | 99e | Phase Imbalance Enable |
| 99 | 99f | Automatic Thermal Reset Enabled |
| 99 | 99g | Jam Enable |

Switches 97a–97f provide a user selectable address of a predetermined heater option. For example, for a particular frame size, a setting of $1_{10}$ (i.e., $000001_2$) may correspond to a heater option of about 0.24–0.26 A rated motor current with a trip point of about 0.27 A, and a setting of $2_{10}$ (i.e., $000010_2$) may correspond to a heater option of about 0.26–0.28 A rated motor current with a trip point of about 0.30 A. Switches 99a–99b provide a user selectable address of a predetermined class option. For example, a setting of $1_{10}$ (i.e., $01_2$) corresponds to a class option of 10 s, and a setting of $3_{10}$ (i.e., $11_2$) may correspond to a custom class option of Design E in which the overload/controller module 5 of FIG. 4 will trip in less than 20 s at eight times rated motor current.

Referring to FIGS. 6A–6E, a flowchart of a firmware routine executed by the microcomputer 53 of FIG. 4 is illustrated. After initialization at step 123 of FIG. 6A, the bidirectional terminals 81,85,83 labeled PB5,PB6,PB7, respectively, are set to inputs at step 125. At step 126, a delay timer is started in the microcomputer 53. If PB7 is set, as tested at step 127, then PB7 is tested again at step 129. If PB7 is not set at step 129, then at step 131, a flag COMM is set. On the other hand, if PB7 is set at step 129, then PB6 is tested at step 133 and, if set, then, step 131 is executed. Otherwise, at step 135, if the delay time set at step 126 is not expired, then step 129 is repeated. On the other hand, after the delay expires at step 135, which indicates that PB7 is assumed to be statically set, then at step 137, a flag BELL is set.

If PB7 is not set at step 127, then at step 139, if the delay time set at step 126 is not expired, then step 127 is repeated. Otherwise, at step 141, if PB6 is not set, then PB5 is tested at step 143. If PB5 is not set, then at step 145, a flag TTI is set; otherwise, at step 147, a flag LPBS is set. On the other hand, if PB6 is set at step 141, then at step 149, a flag HPK, corresponding to the module 9 of FIG. 5, is set. Then, at step 151, PB5 and PB7 are reconfigured as outputs. Following steps 131,137,145,147,151, execution resumes at step 153 of FIG. 6B and the settings 79 of the EEPROM memory 77 are read.

During operation of the contactor control system 1 of FIG. 1, a user powers off the system 1 and removes all options which may be attached thereto. Then, the user installs the module 9 onto the option port, formed by pins 33a,33b,33c, 33d,33e of FIG. 3, and powers up the system 1. As discussed above in connection with FIG. 3, the connector member 37 of the module 9 temporarily engages the pins 33a,33b,33c, 33d,33e of module 5 which electrically and mechanically interconnect with the module 9 as well as other optional modules 259, such as module 155 of FIG. 7. The overload/controller module 5 tests the pins 35b,35c,35d and determines which of various options is installed. Options which do not conform to appropriate patterns are rejected.

Referring to Table III, on power up, the microcomputer 53 of module 5 looks at the pin connections in order to see what device, if any, is connected thereto. In the initial start up or power up conditions, with reference to Table III, if terminals PB5,PB6,PB7 respectively read L,L,L, then the microcomputer 53 is connected to a device labelled "TTI" which may be, for example, a trip type indicator or an LED/reset unit (not shown) connected to module 5 through a cable module (not shown). If terminals PB5,PB6,PB7 respectively read H,L,L, then the microcomputer 53 is connected to a discrete logic push button station "LPBS" of a remote unit (not shown), which is also connected to module 5 through the cable module. If terminals PB6,PB7 respectively read L,H, then the microcomputer 53 is connected to the bell module 155 (shown in FIG. 7). If terminals PB6,PB7 respectively read H,H/L (oscillating), then the microcomputer 53 is connected to a communication module "COMM" (not shown). If terminals PB6,PB7 respectively read H,L, then the microcomputer 53 is connected to module 9. If an option is present, and after determining the identity of the option, the interfacing of these various devices or modules is easily done by changing the initial input on terminals PB5-PB7 through the microcomputer 53 to suitable input/output information from/to these modules.

TABLE III

| TERMINAL | PIN | (1) TTI | (2) LPBS | (3) BELL | (4) COMM | (5) HPK |
|---|---|---|---|---|---|---|
| PB5 | 33b | L | H | x | x | x |
| PB6 | 33d | L | L | L | H | H |
| PB7 | 33c | L | L | H | H/L | L |

Once the hardware programmer module 9 has been recognized as a valid option, an additional test is performed. Referring to FIG. 6B, at step 157, if the "HPK" flag was set at step 149, then at step 159, variable COUNT is set to 7. At step 161, terminal PB7 is strobed by clearing terminal PB7, delaying for a suitable interval, and then setting terminal PB7. Next, at step 163, terminal PB6 is read and, if set at step 165, bit(COUNT) of variable HIGH BYTE is set at step 167. On the other hand, if terminal PB6 is clear, then bit(COUNT) of variable HIGH BYTE is cleared at step 169. At step 171, terminal PB5 is strobed in a manner similar to the strobing of terminal PB7 at step 161. Next, at step 173, COUNT is decremented. At step 175, if COUNT is not less then 0, then step 161 is repeated. Otherwise, at step 177, COUNT is set to 7. At step 179, terminal PB7 is strobed as discussed above with step 161. Next, at step 181, terminal PB6 is read and, if set at step 183, bit(COUNT) of variable LOW BYTE is set at step 185. On the other hand, if terminal PB6 is clear, then bit(COUNT) of variable LOW BYTE is cleared at step 187. At step 189, terminal PB5 is strobed as discussed above with step 171. Next, at step 191, COUNT is decremented. At step 193, if COUNT is not less then 0, then step 179 is repeated. Otherwise, execution resumes at step 195 of FIG. 6C.

As discussed above in connection with FIG. 4, the terminals PB5,PB6,PB7 as controlled by the microcomputer 53 form a serial-to-parallel converter circuit which inputs the state of the DIP switches 97,99 of FIG. 5 and, hence, the settings 79 for the selectable operating features. The PB7 load output, PB6 serial input, and PB5 clock output are connected to the LOAD/ input, circuit 105 QH serial output, and CLK clock input, respectively, of the parallel-to-serial converter circuit 101 of FIG. 5.

Figure 6A:
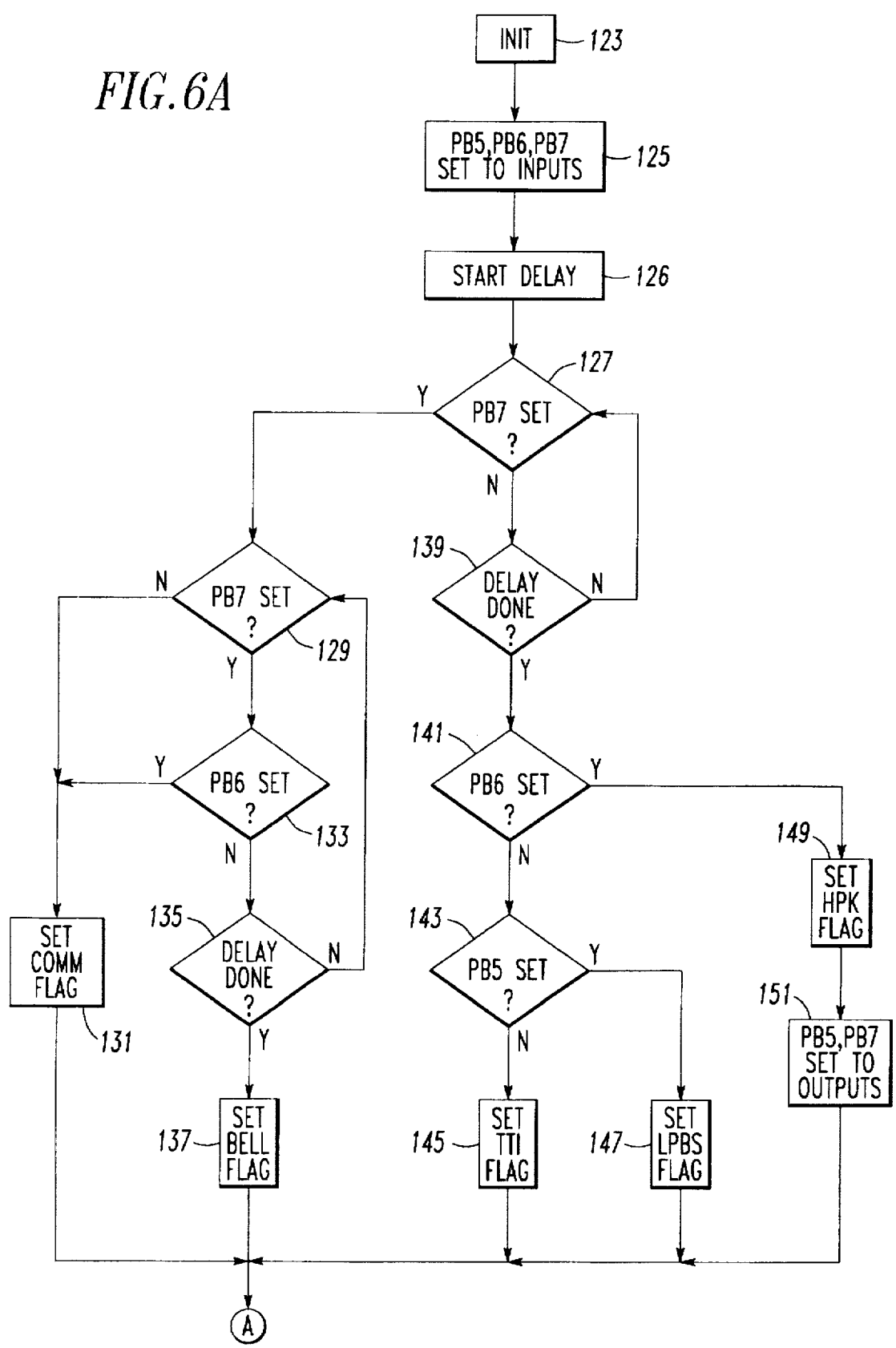
FIGS. 6A–6E are flowcharts of a firmware routine executed by the microcomputer of FIG. 4.
Figure 6B:
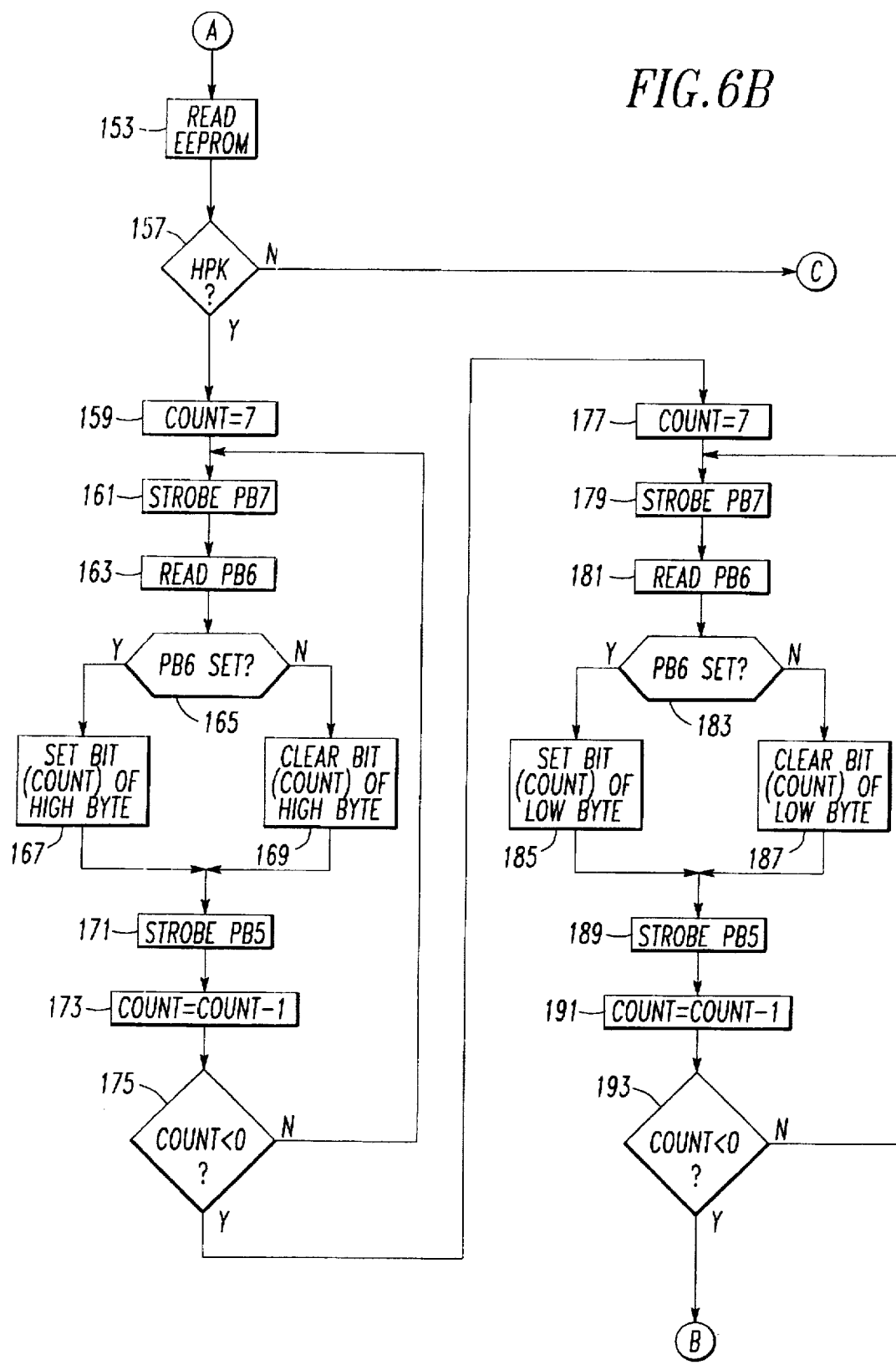
Figure 6C:
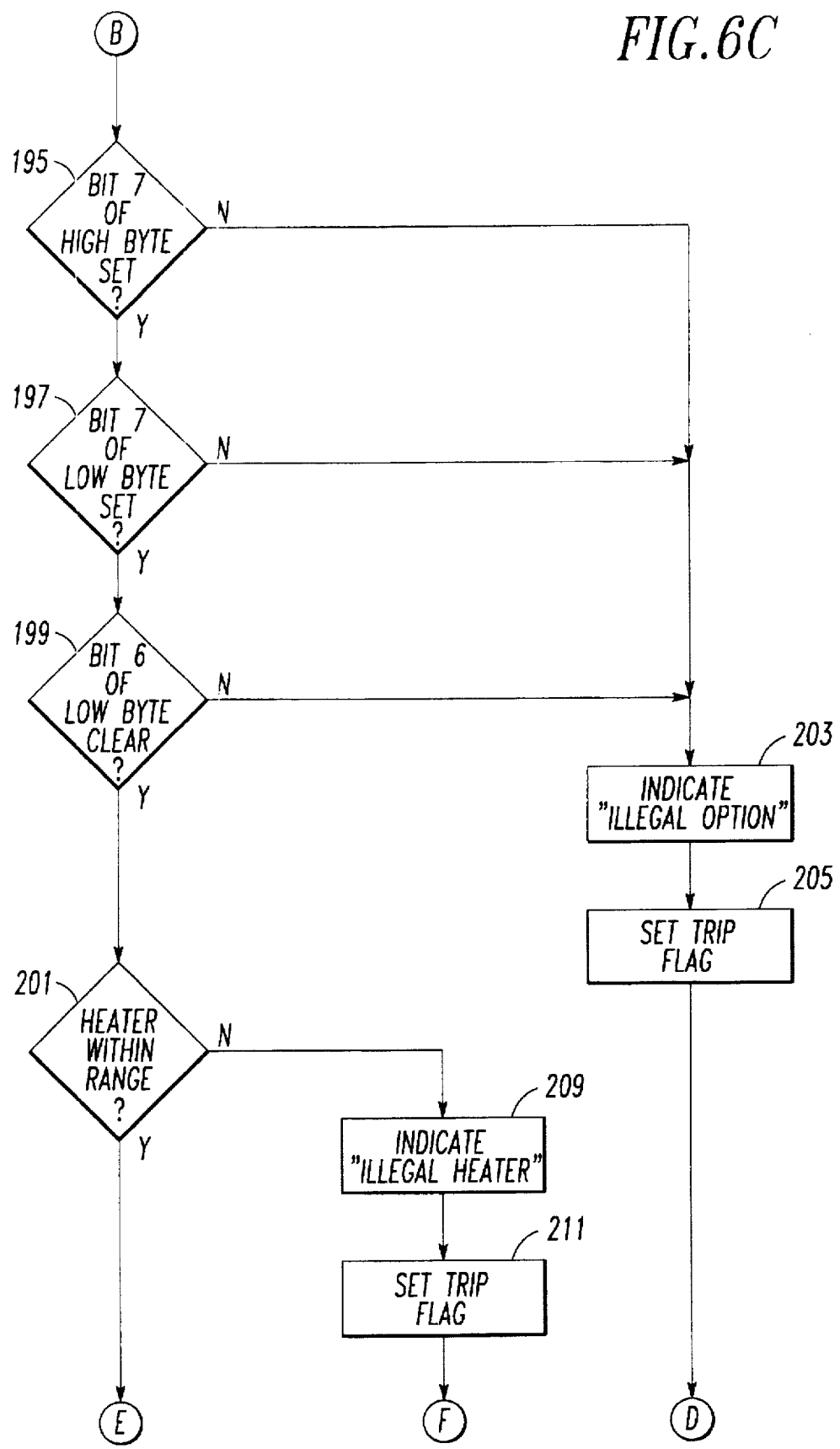

Referring to FIG. 6C, at steps 195, 197, and 199, bit 7 of HIGH BYTE, bit 7 of LOW BYTE, and bit 6 of LOW BYTE, as input by steps 159-193 of FIG. 6B, are checked for the exemplary pattern "set, set, and clear", respectively. If this pattern is present, then execution resumes at step 201. This pattern or identification code, as discussed above in connection with FIG. 5, is set by the input H of circuit 105 and the inputs H,G of circuit 103 which form an identification circuit for outputting the pattern to identify module 9. Steps 195,197,199 compare the exemplary identification code with the predetermined pattern or code "set, set, and clear". As discussed above in connection with FIG. 5, the serial data stream bits 0 and 8 are always true and bit 9 is always false. If the pattern is not present, either an illegal option module is installed or, else, one or both of the modules 5,9 are communicating improperly. In this case, the serial data is not accepted and an "illegal option" is indicated at step 203 by lighting LED 67 and flashing LED 69 on and off twelve times. In this manner, a fault or error code is output to the user when the identification code, provided by the predefined bits of circuits 103,105, is different from the predetermined bit pattern. Then, a flag TRIP is set at step 205. Steps 159-193 of FIG. 6B, and steps 195-199 and 203-205 of FIG. 6C, test the operation of the parallel-to-serial converter circuit 101 of FIG. 5 and the serial-to-parallel converter of the microcomputer 53 of FIG. 4.

If the predetermined pattern is present, at step 201, the setting for HEATER, as input at steps 177-193, is determined to be in range by examining bits 5-0 of LOW BYTE which correspond to the settings from the respective switches 97f-97a. This is accomplished by determining if the value (base 10) corresponding to the binary value of the bits 5-0 of LOW BYTE is within the range defined by variables "Max_Heat" and "Min_Heat", thereby comparing the HEATER setting with a range of appropriate settings. These limits vary based on the overload size and if Design E is selected. For example, "Min_Heat" is 0, and "Max_Heat" is 46 for Nema motors or 42 for Design E motors. For one particular frame size, this supports a range of rated motor current between about 0.22 A, and about 19.0 A for Nema motors or about 13.0 A for Design E motors. As another non-limiting example, for another frame size in which "Min_Heat" is 33, and "Max_Heat" is 46 for Nema motors or 42 for Design E motors, the range of rated motor current is between about 8.9 A, and about 33.7 A for Nema motors or about 23.0 A for Design E motors. If the setting for HEATER is in range, execution resumes at step 207 of FIG. 6D. Otherwise, if a setting lower than "Min_Heat" or higher than "Max_Heat" is entered, then such setting is forced to "Min_Heat", and an "Illegal Heater" is indicated at step 209 by lighting LED 69 and flashing LED 67 on and off 14 times, thereby outputting a fault code to the user in the event the HEATER setting is outside the appropriate range. Then, the flag TRIP is set at step 211.

Figure 6D:
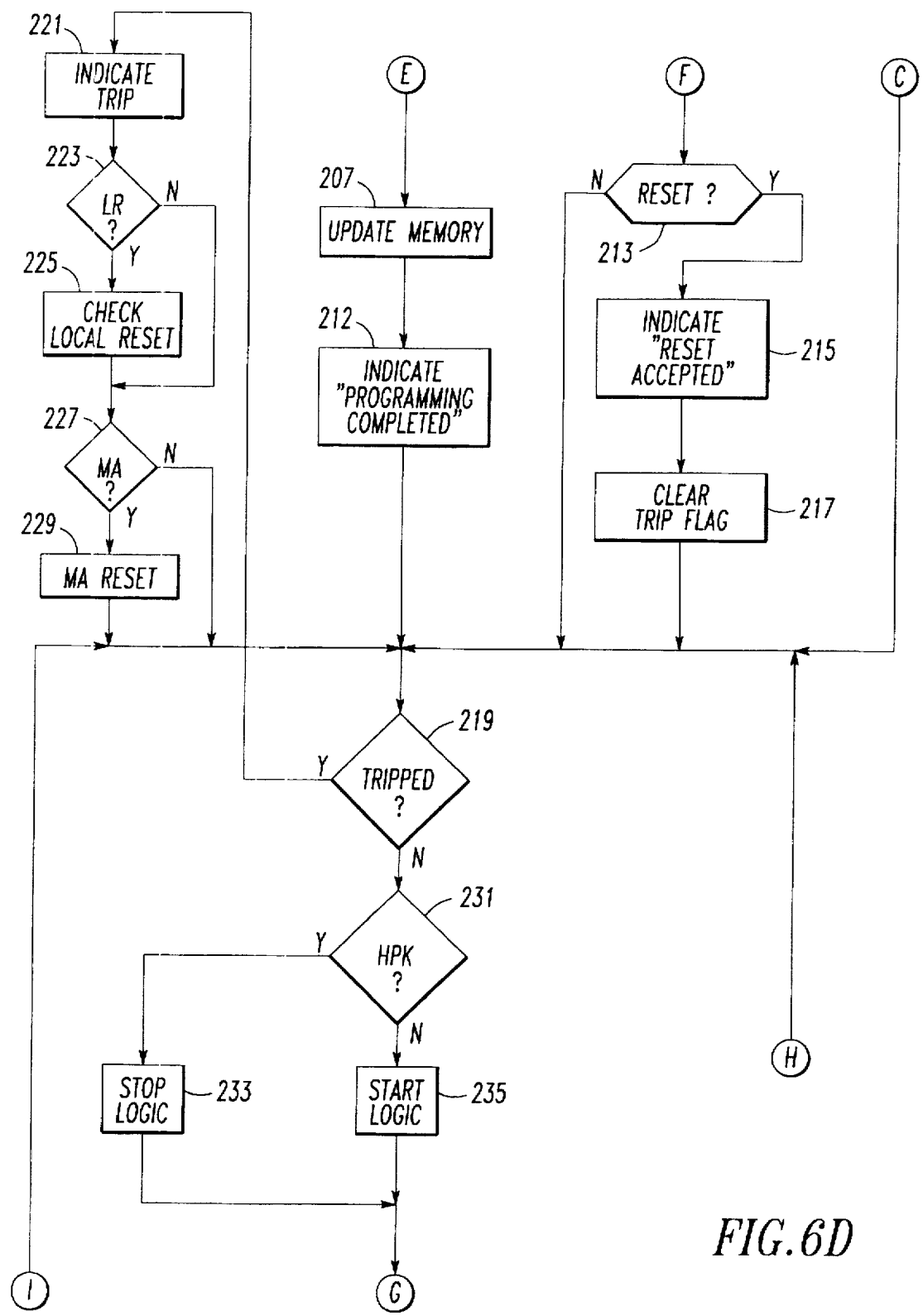

Referring to FIG. 6D, following step 201 of FIG. 6C, with the setting for HEATER in the appropriate range, the non-volatile EEPROM memory 77 of FIG. 4 is updated at step 207 with the values of HIGH BYTE and LOW BYTE, thereby storing the state of the DIP switches 97,99 and changing the settings 79 for the selectable operating features in the memory 77. Also, any custom settings set by another programming device (not shown) in the volatile memory (not shown) of the microcomputer 53 of FIG. 4 are cleared. Next, at step 212, a completion code, indicating "Programming Completed" is output to the user by extinguishing LED 69 and by flashing LED 67 at a 2 Hz rate to indicate that the programming sequence is complete. This confirms that the predefined pattern (set, set, and clear), discussed above in connection with steps 195-199 of FIG. 6C, has been received and that the settings 79, corresponding to the state of the DIP switches 97,99, have been stored in the memory 77.

At step 213, following step 211 of FIG. 6C with the setting for HEATER in an inappropriate range, if the pushbutton 65 of FIG. 4 is depressed for about 100 ms, then at step 215 "Reset Accepted" is indicated by lighting LED 69 and flashing LED 67 on and off at 2 Hz. Then, the flag TRIP is cleared at step 217. Otherwise, if there is no reset at step 213 and, also, after steps 212,217, execution resumes at step 219 and the flag TRIP is checked. If set, then at step 221, the trip state is displayed by lighting LED 67 and flashing LED 69 on and off periodically. Next, at step 223, if local reset (LR) through the pushbutton 65 is enabled, then the presence of a local reset is checked at step 225. Otherwise, only a remote reset from a remote reset source (not shown) is accepted, and after step 225, execution resumes at step 227.

At step 227, the MANUAL/AUTOMATIC RESET (MA) flag is loaded from memory 77 and, if set or enabled, an automatic reset algorithm is executed at step 229. When enabled, the automatic reset algorithm is used by the microcomputer 53 to perform an automatic reset command after a predetermined cooldown period in order to attempt to automatically close the separable contacts 20 of FIG. 4 following a thermal, phase imbalance or phase loss trip. This algorithm, when enabled, resets the flag TRIP set by the overload, phase loss and phase imbalance trips (discussed below in connection with FIG. 6E) after about two to three minutes. If power is removed during this time, then the module 5 resets about two to three minutes after power is restored. Following step 229, or if the MANUAL/AUTOMATIC RESET flag is clear or disabled at step 227, execution resumes at step 219.

Referring to FIGS. 4 and 6D, if the flag TRIP is not set at step 219, then at step 231, the flag HPK of step 149 of FIG. 6A is checked. If set, then stop logic is executed at step 233 which through output 63 and coil control circuit 55, deenergizes coil 49 and opens the separable contacts 20. In this manner, when steps 125-127,139,141,149 of FIG. 6A and step 231 detect engagement of module 5 by module 9, the coil control circuit 55 is disabled, and the motor 47 is not run by the contactor control system 1 of FIGS. 1-3 if the hardware programmer module 9 is installed. Once the module 9 is removed, the operating feature selections may be verified using a verify mode of module 5 with the reset button 65 and the LED's 67,69. The DIP switches 97,99 of FIG. 5 are intended to be set by the user before module 9 is installed. The module 9 is only recognized during power up of the contactor control system 1. No further selection may be entered while the system 1 is powered. Otherwise, if the flag HPK is not set at step 231, then start logic is executed at step 235 which may close the separable contacts 20.

Figure 6E:
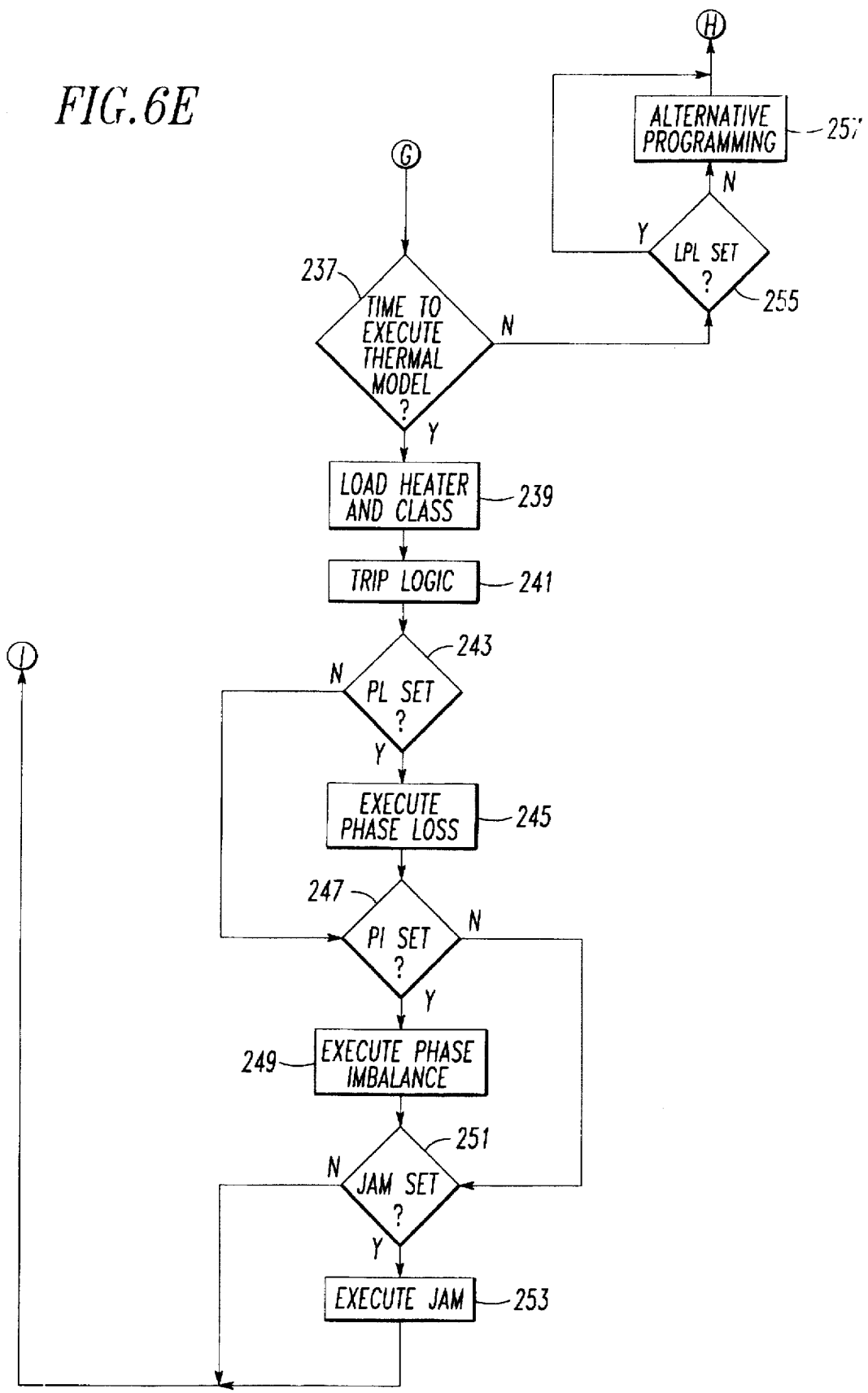

Referring to FIGS. 4 and 6E, a thermal model is run periodically. Steps 237-253 control operation of the coil control circuit 55 with the selectable operating features. If a periodic time increment has elapsed at step 237, then the HEATER and CLASS values are loaded from memory 77 at step 239, and conventional trip logic is executed at step 241. This logic calculates a trip point and an accumulated heat value and, if appropriate, sets the flag TRIP which is checked at step 219 of FIG. 6D.

At step 243, the PHASE LOSS ENABLED (PL) flag is loaded from memory 77 and, if set or enabled, a phase loss algorithm is executed at step 245. The microcomputer 53 determines whether one or more of the phases L1,L2,L3 is unavailable by the absence of one or more of the currents IA,IB,IC for the associated phases. This algorithm compares the minimum $I_{MIN}$ and the maximum $I_{MAX}$ of the currents IA,IB,IC and generates a difference term PL_DIFF therefrom. If the difference term PL_DIFF is less than the rated current $I_{RATED}$, then a loss term LOSS is set to PL_DIFF/$I_{RATED}$. Otherwise, the loss term LOSS is set to PL_DIFF/$I_{MAX}$. An exemplary loss trip level is about 60%. If the loss term LOSS is greater than or equal to 60%, then the flag TRIP is set and the module 5 ultimately trips. The trip time is proportional to the loss term LOSS squared. The loss squared term $LOSS^2$ is input by the thermal model in which a phase loss trip occurs when a value is reached in the model that is equal to the loss trip level. Following step 245, or if the PHASE LOSS ENABLED flag is clear or disabled at step 243, execution resumes at step 247.

At step 247, the PHASE IMBALANCE ENABLED (PI) flag is loaded from memory 77 and, if set or enabled, a phase imbalance algorithm is executed at step 249. The microcomputer 53 determines whether one of the currents IA,IB, IC is imbalanced with respect to the other of the currents IA,IB,IC. This algorithm also compares the minimum $I_{MIN}$ and the maximum $I_{MAX}$ of the currents IA,IB,IC and generates a difference term PI_DIFF therefrom. If the difference term PI_DIFF is less than the rated current $I_{RATED}$, then the imbalance term IMBALANCE is set to PI_DIFF/$I_{RATED}$. Otherwise, the imbalance term IMBALANCE is set to PI_DIFF/$I_{MAX}$. An exemplary imbalance trip level is about 15%. If the imbalance term IMBALANCE is greater than or equal to 15%, then the flag TRIP is set and the module 5 ultimately trips. The trip time is inversely proportional to the imbalance term IMBALANCE squared. The imbalance squared term $IMBALANCE^2$ is input by the thermal model in which a phase imbalance trip occurs when a value is reached in the model that is equal to the imbalance trip level. If the imbalance term IMBALANCE is greater than or equal to 60% at the above trip point, then the module 5 will trip on phase loss. Following step 249, or if the PHASE IMBALANCE flag is clear or disabled at step 247, execution resumes at step 251.

At step 251, the JAM ENABLED flag is loaded from memory 77 and, if set or enabled, a JAM protective algorithm is executed at step 253. The JAM algorithm is activated about one second after all of the currents IA,IB,IC drop below the rated current $I_{RATED}$. If the current I ever rises above about 400% again for a duration of about one second, then the JAM algorithm sets the flag TRIP and the motor 47 ultimately trips.

On the other hand, at step 237, if the periodic time increment has not elapsed, then at step 255, the LOCAL PROGRAMMING LOCK (LPL) flag is loaded from memory 77 and, if set or enabled, execution resumes at step 219 of FIG. 6D. This disables the function of step 257, which provides an exemplary function for alternatively, in place of the hardware programmer module 9, programming the settings 79 for the selectable operating features through a variety of entry patterns for the pushbutton 65 in combination with corresponding display patterns of the LEDs 67,69. After step 257, execution resumes at step 219.

Figure 7:
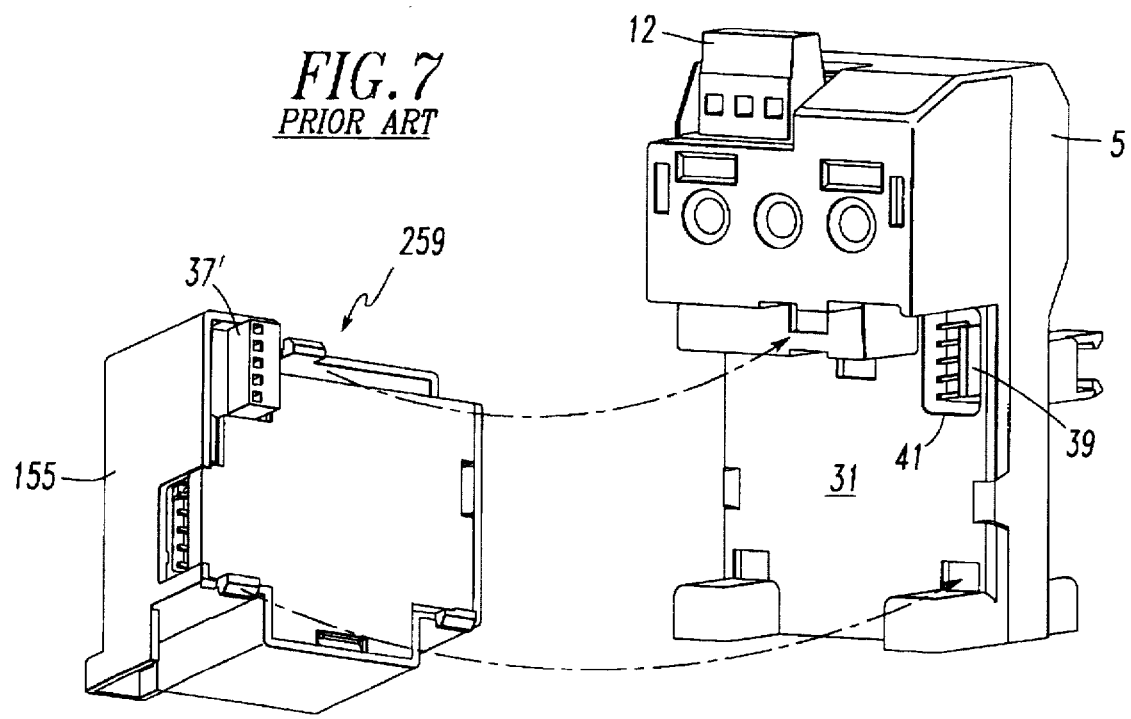
FIG. 7 is an exploded, isometric view of the overload/controller module and another optional module where these modules are rotated to illustrate the electrical and mechanical connections therebetween.

FIG. 7 illustrates overload/controller module 5 and another optional module 259, such as the exemplary bell module 155 or another optional module (e.g., a trip type indicator, LED/reset unit, or discrete logic push button logic device), which employs a connector member 37', similar to connector member 37 of FIG. 3, to interface module 5.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A starter comprising:

separable contacts;

operating means for operating said separable contacts;

overload relay means including memory means for storing at least one setting for at least one selectable operating feature and processor means for retrieving said setting for said selectable operating feature from said memory means and employing said setting for said selectable operating feature at least for controlling said operating means; and module means temporarily electrically and mechanically engaging said overload relay means for changing said setting for said selectable operating feature in said memory means.

2. The starter as recited in claim 1 wherein said module means temporarily electrically and mechanically engaging said overload relay means includes at least one switch means associated with said at least one selectable operating feature and output means for outputting a state of said switch means; and wherein said processor means includes input means for inputting the state of said switch means and means for storing the state of said switch means in said memory means as said setting for said selectable operating feature.

3. The starter as recited in claim 1 wherein said module means temporarily electrically and mechanically engaging said overload relay means includes programmer means for programming said setting for said selectable operating feature.

4. The starter as recited in claim 3 wherein said processor means includes:

means for controlling operation of said operating means with said selectable operating feature;

means for detecting engagement of said overload relay means by said programmer means; and means responsive to said means for detecting engagement for disabling said means for controlling operation.

5. The starter as recited in claim 1 wherein said module means temporarily electrically and mechanically engaging said overload relay means includes identification means for outputting an identification code identifying said module means temporarily electrically and mechanically engaging said overload relay means to said processor means.

6. The starter as recited in claim 5 wherein said processor means includes:

means for inputting the identification code from said module means temporarily electrically and mechanically engaging said overload relay means;

means for comparing the identification code with at least one predetermined code; and means for outputting a fault code to a user in the event the identification code is different from the predetermined code.

7. The starter as recited in claim 2 wherein said at least one selectable operating feature is a plurality of selectable operating features; and wherein said at least one switch means is a plurality of switches associated with said selectable operating features.

8. The starter as recited in claim 7 wherein the switches are dual-inline-package switches.

9. The starter as recited in claim 7 wherein said at least one setting is a plurality of settings for said selectable operating features; wherein said module means temporarily electrically and mechanically engaging said overload relay means includes programmer means for programming said settings for said selectable operating features; wherein said overload relay means further includes means for alternatively programming said settings for said selectable operating features; wherein one of said switches corresponds to said means for alternatively programming said settings for said selectable operating features; and wherein said processor means further includes means for disabling said means for alternatively programming said settings for said selectable operating features in response to said one of said switches.

10. The starter as recited in claim 2 wherein said at least one selectable operating feature is a plurality of selectable operating features; wherein said at least one setting is a plurality of settings for said selectable operating features; wherein said output means includes parallel-to-serial converter means for outputting said settings for said selectable operating features; and wherein said input means includes serial-to-parallel converter means for inputting said settings for said selectable operating features.

11. The starter as recited in claim 10 wherein said parallel-to-serial converter means includes means for inputting the state of said switches, means for inputting a plurality of predefined bits, and means for outputting the state of said switches and the predefined bits to said serial-to-parallel converter means.

12. The starter as recited in claim 11 wherein said processor means further includes means for comparing the predefined bits with a predefined bit pattern in order to test operation of said parallel-to-serial converter means and said serial-to-parallel converter means.

13. The starter as recited in claim 12 wherein said processor means further includes means for outputting a completion code to a user when said predefined bits are the same as said predefined bit pattern, and means for outputting an error code when said predefined bits are different from said predefined bit pattern.

14. The starter as recited in claim 10 wherein said parallel-to-serial converter means includes a load input for loading the state of the switches therein, a serial output, and a clock input for serially shifting the state of the switches out the serial output; and wherein said input means includes a load output, a serial input, and a clock output connected to the load input, serial output, and the clock input, respectively, of said parallel-to-serial converter means.

15. The starter as recited in claim 1 wherein said starter is a motor starter.

16. An overload relay apparatus for use with an electrical contactor, said overload relay apparatus comprising:

overload relay controller means including memory means for storing at least one setting for at least one selectable operating feature and processor means for retrieving said setting for said selectable operating feature from said memory means and employing said setting for said selectable operating feature at least for controlling said electrical contactor; and module means temporarily electrically and mechanically engaging said overload relay controller means for changing said setting for said selectable operating feature in said memory means.

17. The overload relay apparatus as recited in claim 16 wherein said overload relay controller means includes means for electrically and mechanically interconnecting with an optional module means; and wherein said module means temporarily electrically and mechanically engaging said overload relay controller means engages said means for electrically and mechanically interconnecting with the optional module means.

18. The overload relay apparatus as recited in claim 16 wherein said at least one selectable operating feature is an address of a predetermined heater option.

19. The overload relay apparatus as recited in claim 16 wherein said at least one selectable operating feature is an address of a predetermined class option.

20. The overload relay apparatus as recited in claim 16 wherein said at least one selectable operating feature is a feature having an enabled state and a disabled state.

21. The overload relay apparatus as recited in claim 16 wherein said at least one selectable operating feature is a setting for a heater selectable operating feature; and wherein said processor means includes:

means for inputting the setting from said module means temporarily electrically and mechanically engaging said overload relay means;

means for comparing the setting with a range for the setting; and means for outputting a fault code to a user in the event the setting is outside said range.

22. The overload relay apparatus as recited in claim 16 wherein said at least one selectable operating feature includes at least one of heater, class, local programming, phase loss, phase imbalance, manual/automatic reset, and jam selectable operating features; and wherein said overload relay controller means employs said selectable operating features for controlling said operating means.

* * * * *